though the adhesives based on plastics materials, or in any case many of these adhesives, must be classified as resistant to water and climatic effects, and although to a certain extent they penetrate into the pores of the wood, due to the pressure exerted during the bonding of the wooden sheets, the layers of adhesive produced by the process are, nevertheless, to a certain extent penetrable to water vapour, so that it is not possible solely through the use of such adhesives to prevent swelling of finished boards, and particularly not in respect of the thickness of such boards.

United States Patent Office 3,556,897
Patented Jan. 19, 1971

3,556,897
METHOD OF PRODUCING WOODEN BOARDS FROM THIN WOODEN SHEETS
Christen Christoffersen and Karl-Otto Sörensen, Naestved, Denmark, assignors to Vedex Dansk Skovindustrie A/S, Naestved, Denmark
No Drawing. Filed Oct. 23, 1967, Ser. No. 684,092
Claims priority, application Denmark, Oct. 24, 1966, 5,536/66
Int. Cl. B32b 21/00
U.S. Cl. 156—310                      9 Claims

ABSTRACT OF THE DISCLOSURE

Thin wooden sheets, such as thin plies or shavings, are vacuum impregnated with one component of a two-component plastic adhesive prior to being bonded together to form a wooden board through application of heat and pressure and through the use of an adhesive containing an addition of the second component of said two component plastic adhesive. In practice hitherto all two component plastic adhesives have been formaldehyde products, and in such cases the thin wooden sheets ought to be vacuum impregnated with the component different from Formalin. Simultaneously with the said one plastic component the thin wooden sheets may be impregnated with a salt acting as a catalytic agent in the reaction between the plastic components and/or with other impregnating agents.

---

This invention relates to a method of producing wooden boards, by which thin sheets of wood, such as veneers or shavings, are glued together under application of pressure and heat by the use of a two-component adhesive based on plastic materials.

In the past wood has always been considered an excellent building material possessing numerous favourable properties, and it still maintains this position. On the other hand, wood possesses also certain unfavourable properties which, in certain cases may render wood less suitable. Thus wood is sensitive to variation of ambient humidity, which may involve shrinkage or swelling, as the case may be.

Where, in the following, reference is made to "rate of swelling," this term shall mean the dimensional increase resulting from immersion of the wooden article in water for a period of 20 days, assuming the original contents of water to be 6–8%.

It is generally known that the rate of swelling is widely different, depending on the direction it is taken in relation to the location of the wood in the trunk, that is whether measured longitudinally, radially or circumferentially. The rate of swelling in the longitudinal direction is usually relatively unimportant, for beechwood approximately 1 per mille. Radially and circumferentially, on the other hand, the rate of swelling is essentially higher, for beechwood, for example, the radial rate of swelling is 5–6% and the circumferential rate is approximately 10%.

The introduction of plywood and other types of boards made of thin wooden sheets, which are glued together with different orientation of their fibres, involved important progress towards reduction of the sensitivity of the wooden material to humidity, because the very low rate of swelling in the longitudinal direction of the thin wooden sheets reduces expansion and contraction of the board longitudinally as well as transversally, which, when the wooden sheets are tangentially cut veneer, means in the natural longitudinal and circumferential direction of the trunk. This reduction of the rate of swelling is due, however, solely to the adhesive power of the medium by which the sheets (the plies) are glued together. The manner of manufacturing such boards will not however, involve any reduction of the rate of swelling in respect of the thickness of the board, that is in the radial direction when tangentially cut veneer is used.

Further progress was attained when the adhesives of animal origin, as originally used, were replaced by adhesives non-soluble in water, usually adhesives based on plastic materials such as formaldehyde-plastic adhesives, which have proved to provide a bonding that is resistant to water and climatic effects, so that they involve an essential reduction of the tendency of the wood to absorb water and, in turn its tendency to swelling.

As a result, the rate of swelling of such plywoods, and similar boards made of beechwood, can be brought down to relatively low values, such as swelling rates longitudinally and transversally of between 1 and 1.2 per mille, whereas the rate of swelling in respect of the thickness of the boards will remain of a magnitude between 4 and 5%.

The object of the invention is to provide a wooden board produced by gluing together thin wooden sheets and being dimensionally stable; that is a board possessing such properties that even the swelling in respect of the thickness of the board is reduced to such an extent that the rate of swelling will not exceed 1 percent.

While previously it was supposed that swelling of wood was due to the water absorbed by the pores of the wood, it has been found by more recent research that this capillary water in itself is of no effect in respect of the swelling, and that the swelling is solely due to the hygroscopically bound water in the intermicellary fissures in the individual cells of the wood. While the absorption of capillary water depends on direct contact with the water, the hygroscopically bound water can be absorbed in the form of vapour, and moreover the force of attraction between the cellulose molecules of the wood-substance and the water molecules is very strong; it may be so strong that it is comparable to the binding power between certain salts and their water of crystallisation. On the other hand, when the wood is exposed to heat combined with a low degree of humidity, the intermicellary fissures will give off part of the hygroscopically bound water.

The invention is based upon the experience that, even though the adhesives based on plastics materials, or in any case many of these adhesives, must be classified as resistant to water and climatic effects, and although to a certain extent they penetrate into the pores of the wood, due to the pressure exerted during the bonding of the wooden sheets, the layers of adhesive produced by the process are, nevertheless, to a certain extent penetrable to water vapour, so that it is not possible solely through the use of such adhesives to prevent swelling of finished boards, and particularly not in respect of the thickness of such boards.

It appears, however, that such swelling can be reduced to such an extent that it will be without any practical importance when the adhesive used for the bonding comprises a two-component plastic-based adhesive, such as urea-formaldehyde, resorcin-formaldehyde, melamine-formaldehyde, or phenolic formaldehyde, provided that, in accordance with the present invention, the wooden sheets are vacuum-impregnated with one of the plastic-components prior to the bonding process and an adhesive having an admixture of the other plastic component being used for the bonding.

In many cases it will be convenient to use only one single type of adhesive, that is one single two-component plastic-based adhesive, and in this case the wooden sheets must be treated with one plastic-component, whereas the adhesive proper, in addition to the quantities of the plastic components normally required when making the adhesives, shall contain a surplus of the other plastic-component. It is possible, however, to use one adhesive for the bonding process proper, and this adhesive may be a one-component or a two-component adhesive of a type differing from the adhesive of which one component has been used for the impregnation of the wood, provided that the necessary amount of the other plastic-component be added to the adhesive used.

The new method requires that one of the plastic-components, as a consequence of the vacuum treatment, penetrate deep into the wood and also into the intermicellary fissures thereof; and thereafter, during the bonding process, for example as a result of the pressure exerted in connection with this process, that the other plastic-component likewise be drawn into the wood, where it will react with the former component, so that a very large part of the entire number of intermicellary fissures will be filled with the plastic material thus produced, whereas penetration of water vapour into the rest of the intermicellary fissures is prevented, or essentially reduced, by the plastic material formed deep in the pores of the wood, depriving thus the intermicellary fissures and the molecules of the cells of their hygroscopicity.

In turn, owing hereto, for example a plywood board made from tangentially cut beechwood veneer, by the new method and with application of a phenolic formaldehyde adhesive, by which method the wooden sheets having been treated with phenol prior to the bonding operation, whereas the adhesive used was a fresh mix of phenol-formaldehyde with an admixture of 10-15% Formalin, has a rate of swelling, longitudinally and transversally, of approximately 0.3 per mille, and in respect of the thickness the swelling-rate is about 0.8%.

The two-component plastic-adhesives that are generally used at the present time are always based on formaldehyde, constituting one of the plastic-components, whereas the other plastic-component, generally, is melamine, urea, phenol, or resorcin. In these cases the wooden sheets may be impregnated with the plastic-component not being formaldehyde, since experience has shown that the Formalin is more easily attracted by the other component than would be the other component by the Formalin, so that it is ensured that in this manner the plastic material formed through reaction between Formalin and the other plastic-component is formed as deep as possible within the structure of the wood.

Although the invention described herein is based on experiments by which solely formaldehyde plastic adhesives normally used at the present time has been applied, it is taken for granted that similar results will be attainable if other types of bonding materials, containing two or more components and being based on other starting material than Formalin, be developed in the time to come.

The impregnating medium with which the wooden sheets are impregnated should contain not less than 4 percent, by weight, of the plastic component not being formaldehyde, in order to insure that the wood will absorb adequate amounts of this component to develop filling of the voids of the wooden structure with the plastic material, to such an extent that the effect aimed at is certain to be attained.

EXAMPLE 1

1 m.$^3$ of beechwood veneer, cut tangentially, consisting of 160 sheets of veneer, each having a thickness of 1 mm., and of 2.5 x 2.5 m. size, were placed in a vacuum container which, after having been closed, was evacuated to about full vacuum, that is to say to a pressure of 15 mm. Hg, corresponding to appproximately 98% vacuum.

Into the container was introduced a solution consisting of 20% diammonium-phosphate, 2% copper sulphate, 8% urea, and 70% water. After the veneers having remained for some time in the container, the liquid that had not been absorbed by the veneer sheets was transferred to another container, and was measured and analysed, and the veneers were taken out and dried to a moisture-content of approximately 6%.

The veneer sheets had absorbed about 500 litres of the impregnating liquid, and the liquid removed from the container was of the same composition as the original liquid; hence, the veneer had absorbed 40 kg. of urea per m.$^3$, corresponding to 5.7% by weight.

The adhesive mix prepared for the purpose consisted of 100 parts of a pre-mix of phenolic formaldehyde adhesive, 15 parts of Formalin, 10 parts of diammonium-phosphate, 25 parts of kaolin, and 15 parts of paraformaldehyde. Of 15 veneer sheets, every second received on both sides an 0.2 mm. coating of the adhesive mix, whereafter the sheets were piled in a veneering press heated to 120° C., the grain of adjacent plies being at right angles to each other, in which press they were compressed, the pressure exerted being about 30 kg./cm.$^2$.

The resulting plywood board had a thickness of 12-13 mm., and as a consequence of the diammonium-phosphate contained in the impregnating liquid, and of the contents of diammonium-phosphate and kaolin in the adhesive, the board possessed extreme fire resisting properties, in addition to several other qualities of particular advantage with a view to the application envisaged, for example nailability.

The board was subjected to a swelling test, whereby the board as in the original condition, containing approximately 7 percent of moisture, was immersed in water for a period of 20 days. After having been removed from the water bath and wiping off of water, the board appeared to be unaffected by the immersion in the water, and the swelling longitudinally and transversally was only 0.25 per mille; the swelling in respect of thickness was only 0.7 percent.

It should be noted that the admixture of paraformaldehyde to the adhesive mix served as a catalytic agent for development of the phenol-formaldehyde compound, whereas the diammonium-phosphate in the wood, being an acidic salt, has functioned as a catalyst in the formation of the urea-formaldehyde compound within the wooden structure.

Corresponding results were obtained where the urea in the impregnating liquid was substituted by 10% of resorcin, or by 10% melamine, at the same time as a premix of urea-formaldehyde being used in the adhesive mix instead of the premix of phenolic formaldehyde.

EXAMPLE 2

21 1-mm. beechwood plies were vacuum treated with a 15% aqueous solution of phenol and, after removal from the vacuum container and drying until a moisture content of about 6%, every second of the veneer plies was coated on both sides with an adhesive mix consisting of 80 parts of a premix of resorcin-formaldehyde adhesive and 20 parts of Formalin. The plies were piled in a veneering press heated to a temperature of approximately 140° C., and compressed at a pressure of 20 kg./cm.$^2$.

The resulting plywood board had a thickness of 20 mm. and was weather resistant. It possessed qualities similar to those of known plywood boards. However, the rate of swelling longitudinally and transversally was less than 1 per mille, and in respect of the thickness it was as low as 0.9%.

In this case no addition of catalysts was required, neither to the impregnating liquid nor to the adhesive mix, the heat applied being sufficient to involve the phenol-Formalin condensation as well as the resorcin-Formalin condensation.

Where, however, the plastic-adhesive, of which one component is incorporated in the wooden sheets, requires a catalyst for development of the condensation or the reaction between the component, the sheets may in addition to the component of the adhesive also be impregnated with a salt acting as a catalytic agent in the development of the plastic material, whereby it is ensured that the development of plastic within the wooden structure becomes as complete as possible. Relatively favourable results can be attained, however, even if the catalyst be added to the adhesive mix only, although in this manner it is not possible to ensure that the plastic-impregnation of the wood reaches a depth equal to the depth attainable when the catalytic agent is added to the impregnating liquid.

Since the new method requires treatment of the wooden sheets, the sheets could usually most conveniently be impregnated at the same time with salts or other matters that can provide the completed plywood board with special properties, for example, as mentioned under Example 1 in the preceding, with salts involving or contributing to development of fire resistant properties of the completed board.

We claim:

1. In a method for producing wooden boards from thin wooden sheets, such as thin veneers or shavings, by applying an adhesive (A) between the thin wooden sheets and binding said wooden sheets together thereafter through application of heat and pressure, the preliminary steps comprising vacuum impregnating said sheets with one of the two components of a two-component-plastic-adhesive (B) and admixing with the adhesive (A) the other of said two components of the two-component-plastic-adhesive (B).

2. A method according to claim 1 wherein said adhesive (A) is a two-component-plastic-adhesive.

3. A method according to claim 1 wherein said two-component-plastic-adhesive is a formaldehyde product and the one of the two components is different from formaldehyde.

4. A method according to claim 2 wherein the one of the two components is other than formaldehyde and is employed in vacuum impregnating said sheets in the form a solution containing at least 4 percent by weight of said component.

5. A method according to claim 1 wherein the two components of the two-component-plastic-adhesive form a reaction and said sheets are impregnated with a salt which acts as a catalytic agent in the reaction.

6. A wooden board produced by the method defined in claim 1.

7. A method according to claim 1 wherein the wooden sheets are impregnated with the one of the two components to a concentration therein of in the order of 40 kilograms per cubic meter of said sheets.

8. A method according to claim 7 wherein said one of the two components is a member selected from the group consisting of urea, resorcinol, melamine and phenol.

9. A method according to claim 8 wherein said adhesive (A) is a two-component-plastic-adhesive.

References Cited

UNITED STATES PATENTS 2,321,258  6/1943  Stamm et al. _____ 156—335X

REUBEN EPSTEIN, Primary Examiner

U.S. Cl. X.R.

156—285, 307, 335; 161—261

UNITED STATES PATENT OFFICE
CERTIFICATE OF CORRECTION

Patent No. 3,556,897           Dated January 19th, 1971

Inventor(s) Christen Christoffersen and Karl-Otto Sörensen

It is certified that error appears in the above-identified patent and that said Letters Patent are hereby corrected as shown below:

Column 1, line 5, change "Skovindustrie" to --Skovindustri- Column 6, line 4, after "form" insert --of--.

Signed and sealed this 13th day of July 1971.

(SEAL)
Attest:

EDWARD M. FLETCHER, JR.        WILLIAM E. SCHUYLER, JR.
Attesting Officer                Commissioner of Patents